Dec. 17, 1963 W. HARDY 3,114,622
WASTE MATERIAL CONVERTER AND METHOD OF DIGESTING WASTE
Filed Aug. 26, 1960 2 Sheets-Sheet 1
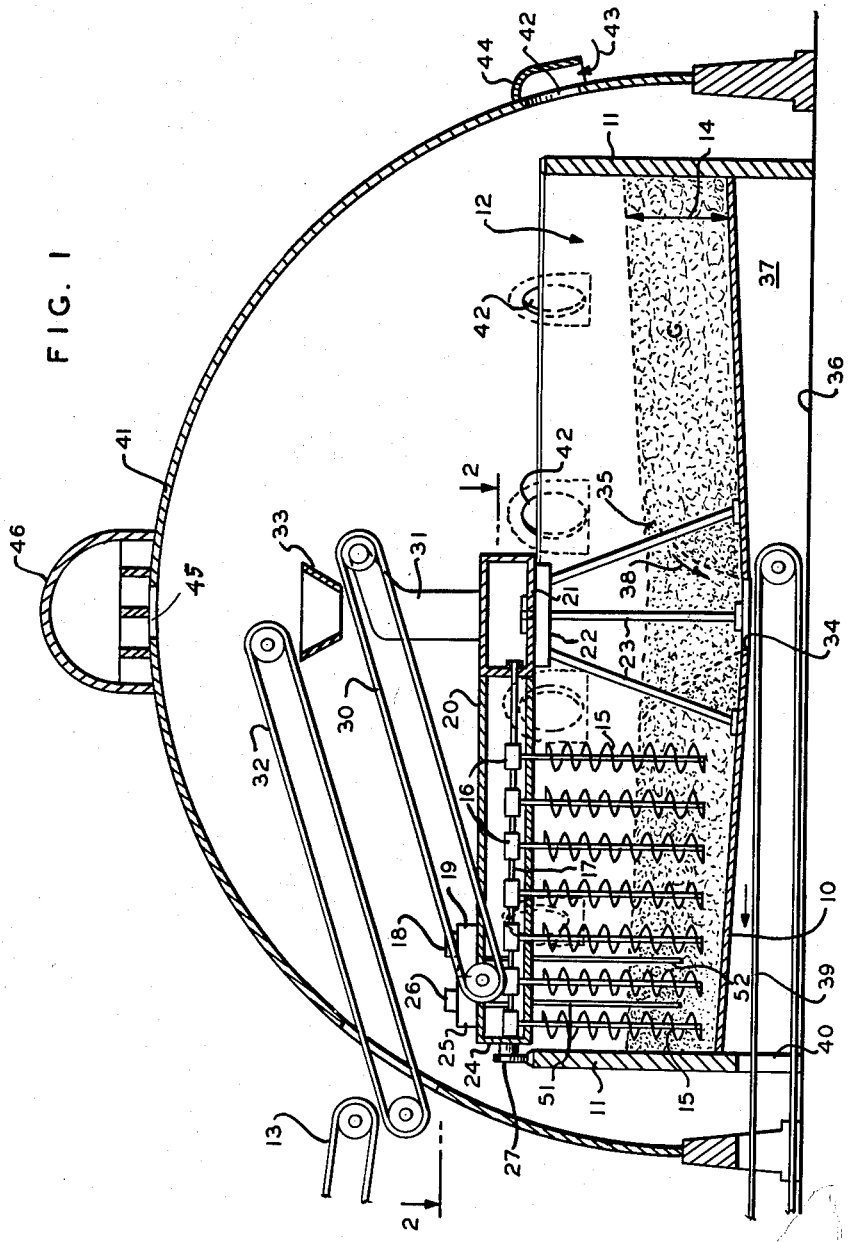
INVENTOR.
WOODROW HARDY
BY
ATTORNEY Dec. 17, 1963  W. HARDY  3,114,622
WASTE MATERIAL CONVERTER AND METHOD OF DIGESTING WASTE
Filed Aug. 26, 1960  2 Sheets-Sheet 2
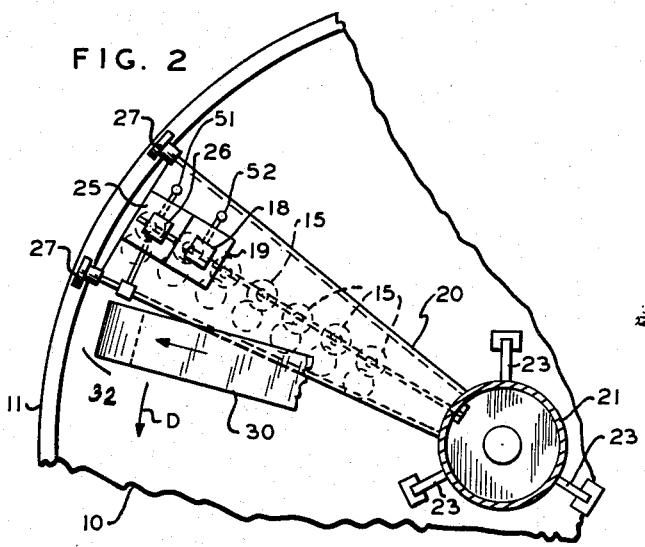
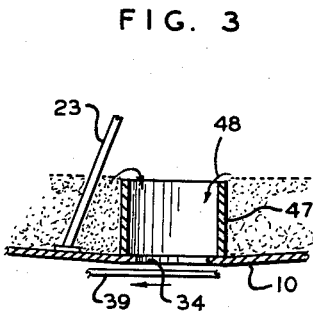
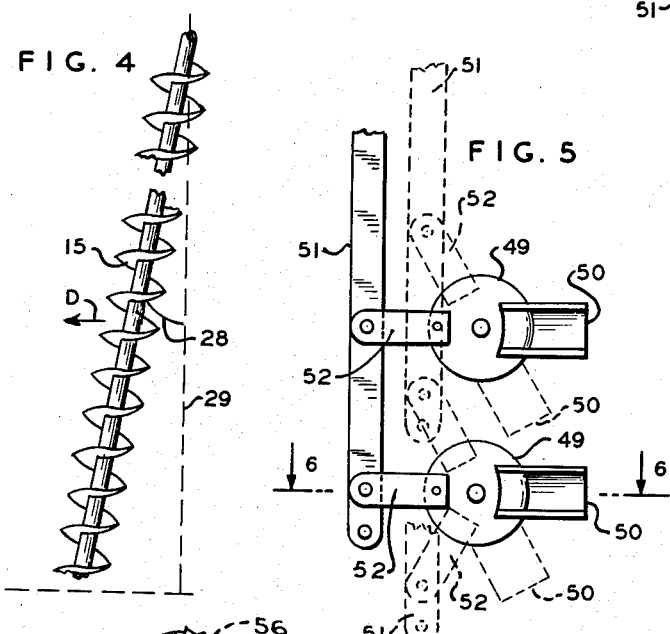
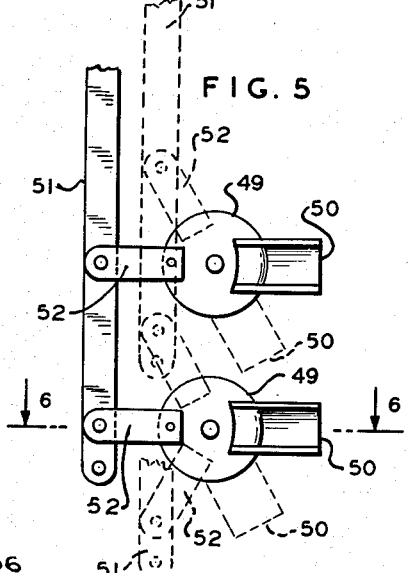
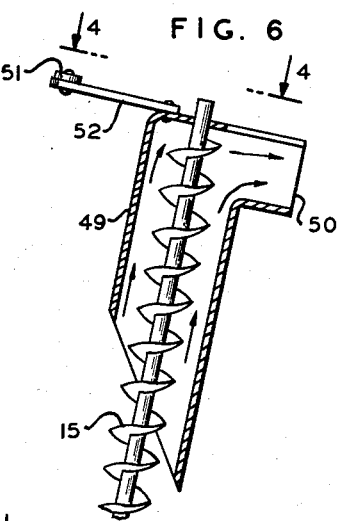
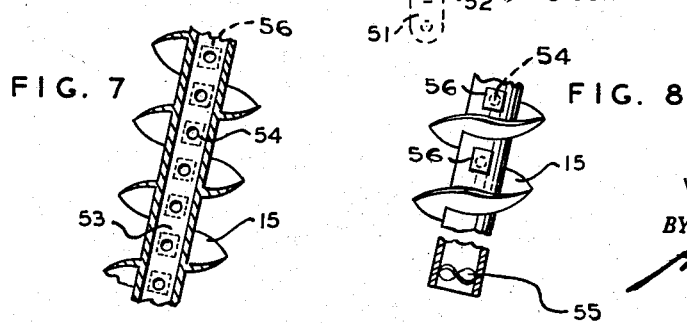
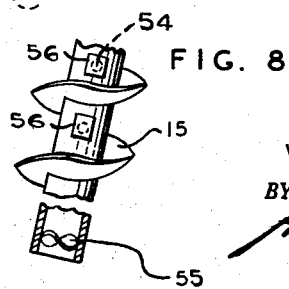
INVENTOR.
WOODROW HARDY
BY
ATTORNEY

United States Patent Office 3,114,622
Patented Dec. 17, 1963

3,114,622
WASTE MATERIAL CONVERTER AND METHOD
OF DIGESTING WASTE
Woodrow Hardy, Somerville, N.J., assignor to The Fairfield Engineering Company, Marion, Ohio, a corporation of Ohio
Filed Aug. 26, 1960, Ser. No. 52,078
12 Claims. (Cl. 71—9)

This invention is directed to an apparatus for and method of treating waste organic material, such as garbage, with a view to converting the same into a finished fertilizer material smelling like good clean garden soil.

The material produced by this process has no offensive odor, will not attract flies or vermin, and is substantially sterilized and sanitary.

The digester of the present invention is so designed and operated that it actually constitutes an incubator for the aerobic thermophilic decomposition bacteria contained in the garbage or other organic refuse.

Conditions of air, temperature and agitation are maintained in the digester so that the large mass of material in all stages of decomposition in the digester contains overwhelming numbers of bacteria. Actually their numbers are limited only by the amount of food available to them. Thus as new food, in the form of organic matter, is added to the digester and mixed with this tremendous bacterial population pursuant to the invention, it is completely inoculated and decomposed in the shortest possible time. Others find it necessary to add certain laboratory prepared cultures and some require the recycling of previously decomposed material to effect this inoculation. Both of these methods are costly and only partially achieve the results obtainable in the digester of this invention.

Many digesters have been designed using decks and other devices to separate one portion of the digester from the other portions. In such digesters decomposition is begun by mesophilic bacteria which live at normal atmospheric temperatures. These decomposition bacteria are exothermic in nature and create heat far in excess of that which they can tolerate. As this excess heat is produced these bacteria become dormant and finally sterilize themselves. Then another group thriving in a higher temperature range gradually come into being and eventually sterilize themselves. This cycle is repeated many times before thermophilic temperatures are reached and thus the decomposition is slowed perceptibly.

In the digester of this invention where ideal thermophilic temperatures of 140° F. to 150° F. are maintained at all times in a large volume of material and a small amount of new material is added to, and mixed with, this greater amount of warmer material, the resulting higher temperature is transferred to this incoming material and active thermophilic decomposition proceeds immediately.

Digesters operating at normal atmospheric temperatures encounter extreme production of pathogenic organisms and this creates a grave health problem.

With the temperature in excess of 140° F. being maintained in all the material in the digester of this invention all pathogenic organisms are sterilized.

Other devices proposed for the purpose seemed desirable in small scale demonstrations but when designed in commercial sizes were hampered by excessive torque requirements that made them impractical and they were finally abandoned.

Other mechanisms for agitation moved the material generally from where it was received toward a discharge area, making it necessary to feed the precise amount into the digester that the agitating mechanism could move through the digester. Overfeeding caused a pile up of material against walls, ceiling and other mechanisms and finally caused breakage of the machine. Underfeeding caused the digester to become empty or run at far less than capacity; in any event digester action was hindered and sometimes completely stalled. At times, during week ends and holidays—when no material was being received it was impossible to agitate the material without completely emptying the machine. The choice was to agitate the material and empty the machine and start all over from scratch at a later date or to let the material stand and produce putrifactive odors and pathogenic germs. To overcome this holding bins were used to store material so that it could be fed into the digester on a continuous basis. These bins become contaminated with flies, rats and other insects and produced such foul odors and unsanitary conditions that they were finally discarded.

The digester of this invention can be operated and agitated on a continuous and/or intermittent schedule independent of all feeding of materials. Feeding can be done on a continuous basis or intermittently as the case may require; the digester will not discharge material below predetermined depth. Material fed into the digester that raises the level of the material in the digester above the discharge point will cause finished material to overflow into this discharge port as long as such feeding continues.

The digester of this invention uses conveyor means, such as screws that will not clog or jam to lift the material from the floor and bring it to the top of the pile and to aerate the material and cause it to exchange heat with fresh atmospheric air. The screws also separate each particle from the other particles so that the atmospheric oxygen can penetrate through, and to the bottom of the pile. Continuous operation of this machine provides a period of agitation followed by a resting period. The period of agitation provides air and permits $CO_2$ and heat to escape. The resting period allows the bacteria to develop, multiply and build up internal heat. Therefore, pursuant to the invention, variation of these periods affords control of all of the above conditions. This action provides an avenue of escape for the carbon dioxide and heat produced by the bacteria. Heat thus released helps to keep the material in the required temperature range. Speed of the agitating screws and speed of the carriage in completing its circuit can be thermostatically or manually controlled. Variations of these speeds is very effective in controlling the temperature. More vigorous agitation at more frequent intervals releases more trapped heat and consequently lowers the temperature of the material.

Bacteria build up end products on the particles on which they feed, through which they cannot penetrate. Constant agitation dislodges this end product and thus presents a new surface for bacterial action. Also bacteria have no means of locomotion and frequent agitation and mixing is the best means for distributing these bacteria among the incoming material.

These agitating screws can be mounted vertically but I find that by using an incline of for example 12° these screws help to pull themselves through the material and driving force is also imparted to the carriage supporting wheels which run on the digester outer wall. This practically eliminates the torque problem that has caused the abandonment of so many other digesters.

Material deposited along the outer wall would ordinarily form a continuous pile at this point except for the leveling action of the agitating screws which travel through all the material in the digester at regular intervals. These screws are very effective in leveling this pile and the material in the digester present a generally level and flat surface. As material is fed into the digster and agitated by the revolving screws the whole level of material in the digester rises and the material that was received along the wall eventually works its way to the center where it overflows and is discharged as a finished, odorless sterilized product. This product will not attract flies or vermin, will not become anaerobic or present any health hazard.

In the drawings, wherein similar reference characters indicate like parts:

FIG. 1 is a medial, vertical sectional view of a processing device embodying the invention, FIG. 2 is a fragmentary plan view thereof, taken at line 2—2 of FIG. 1, FIG. 3 is a fragmentary vertical sectional view of a further form of opening provided in the floor of a device embodying the invention, FIG. 4 is a partly fragmentary elevational view of a screw of the type shown in FIG. 1, embodying the invention, shown inclined at an angle toward the direction of movement D, of the carriage 20, FIG. 5 is a fragmentary top plan view of a further form of screw device embodying the invention, FIG. 6 is a fragmentary elevational view of the form of screw device shown in FIG. 5, taken at line 6—6 of FIG. 5, and FIGS. 7 and 8 are fragmentary vertical sectional views of a form of screw 15 which may be used in carrying out the invention.

In the drawings, a device for processing and converting of waste matter in accordance with the invention is shown comprising a floor member 10 and a wall member 11 secured thereto in upstanding relation and defining therewith an upwardly opening receiver 12 into which garbage G may be deposited from an original source such as schematically indicated at 13 (FIG. 1) for processing in the receiver 12 pursuant to the invention.

The invention is not limited to relative proportions or details of construction; by way of example only, it may be noted that the device 12 may be formed of generally circular form (FIG. 2), with the diameter of the floor member 10 (for example) fifty feet and the depth (14, FIG. 1) of the mass of garbage G being processed in the device six feet. The carriage 20 may be rotated once per hour and the material G thus processed therein for three days prior to discharge. These and other figures mentioned herein are exemplary only and not in any way to be deemed limitative of the invention.

Pursuant to the invention, conveyer means such as a plurality of screws 15 are provided for lifting, aerating, mixing and agitating the mass of material G by suitable means 16 such as gears fixed to the upper ends of said screws and meshing with gears carried by the shaft 17, driven, for example, by a motor 18, which may have a variable speed unit 19 so that its speed may be varied by thermostatic control in direct ratio to changes in temperature of the matter G being processed, with the advantageous results above noted for uniform and efficient conversion and processing of the material G. The temperature control means may, for example, include said speed control unit 19 for controlling the speed of rotation of shaft 17 in accordance with the temperature in the mass G—that factor being sensed by suitable means such as a thermostat 52 carried by the speed control unit 19 whose output speed of rotation of shaft 17 for driving screws 15 is thus changed directly and automatically in accordance with temperature changes in the mass G. Thus, as the temperature of the mass rises, the shaft 17 will be rotated at a correspondingly increased speed, thus more rapidly agitating and aerating mass G and lowering the temperature thereof. Conversely, as the temperature of mass G falls, the screws 15 will be driven more slowly unitl the temperature rises to the desired point. Thus a temperature range from 120° to 170° may be automatically maintained therein.

The screws 15 may be conveniently journalled in the device for movement spaced apart and in line. For example, as shown in FIG. 1, the screws may be journalled in a carriage 20, one end 21 of which may be rotatably mounted on a bearing 22 supported by spacer means 23 in spaced relation to the floor 10. Carriage 20 may be moved through the device to thus move the line of screws 15 through the mass G to be thereby processed, by providing one or more wheels 27 at the opposite end 24 of the carriage (FIGS. 1 and 2) for movement on the wall 11 and journalling said wheels in said carriage for rotation by the same shaft 17 which rotates screws 15 or by separately rotating the wheels by a motor 26 which may have a thermostatic control 51 for controlling the variable speed device 25 for driving the wheels. The thermostatic speed control arrangement for the wheels 27 may thus be similar to that provided for the screws 15 (and may be the same in case the wheels and screws are driven by the same motor). As temperature of mass G falls, the wheels would be rotated at lower speed to move the carriage more slowly and elevate the temperature; conversely, as temperature of mass G rises, the wheels would be driven more rapidly. Thus the desired temperature range, such as 140° to 150° F. may be automatically maintained. The screws 15 may be so formed that, when so rotated, they will spirally lift the material G for the processing thereof in accordance with the invention. Said screws may be inclined at an angle 28 (FIG. 4) such as 12° angle, to a vertical line 29 such that rotation of the screws will while so lifting the material G also assist in pulling the screws and carriage 20 through the material in the desired direction D (FIG. 2). The screws are arranged in spaced parallel relation, the first screw (FIG. 1) being preferably disposed very close to the wall member 11—one half inch away, for example.

A conveyor 30 carrying the material from the source 13 into the receiver 12 may be provided and such conveyor may be secured at one end, for example, as shown by the bracket 31 (FIG. 1) to the casing 20 so that the conveyor 30 will move with said casing in the operation of the device with the lower end of the conveyor 30 preferably disposed at the side of the carriage 20 in the direction D of movement (FIG. 2) so that material from the conveyor will be deposited (at 32, FIG. 2) in advance of the moving carriage 20 and adjacent the wall 11. The new material thus added will move into the mass G and be processed with the previousiy received material in accordance with the invention. If desired, a hopper 33 may be positioned in the device intermediate conveyor 32 for the original source of material 13 and conveyor 30. The conveyors 13, 30, and 32 may be suitably rotated by motor means not shown.

The floor 10 may be provided with a medial opening 34 therein. In the practical operation of the device, the material G being processed will move radially inwardly and upwardly to define a cone shaped opening 35 so that as further material is added, the mass G rises to a greater height, the material G will progressively move toward the center and overflow the cone shaped opening 35 to be discharged through the floor opening 34. The device may be made as shown in FIG. 1 with a sub-floor 36 which, with the floor 10, defines the intermediate space 37 into which the material is finally slowly discharged as noted at 38 (FIG. 1) and whence it may be removed mechanically or automatically as schematically indicated in FIG. 1 by a conveyor 39 driven by suitable motor means not shown, to convey the discharged, processed material through the opening 40 in the wall 11 and to a point therebeyond.

As shown in FIG. 1, the receiver 12 of the invention may be enclosed within a housing shell 41 which may have openings 42 therein generally in line with the top of the mass G for the admission of fresh atmospheric air as noted at 43 into the receiver 12; openings 42 may be protected by covers 44. A further opening 45 may be provided at the top of the shell 41 and protected by a cover 46 for discharge of carbon dioxide gas generated by the treated mass G.

If desired (FIG. 3) the opening 35 in the mass G of material may be formed by fixing a pipe 47 to the floor 10 in registry with the opening 34 therein so that the mass G of material will overflow said pipe (as noted at 48) into the discharge opening 34. As shown in FIG. 6, if desired, the screws 15 may be positioned within pipes 49 having discharge ports 50 emptying to points opposite the direction D of movement of carriage 20 (FIG. 2).

Pipes 49 may be rotated so that their upper discharge ports 50 will be moved to discharge the material at correspondingly different points, by suitable link means 51, 52 (FIG. 5) connected to said pipes at 53 and movable manually or automatically through link control rod 51.

Screws 15 may be formed hollow axially as indicated at 53 (FIG. 7) and may have holes 54 formed therein each provided with a shield 56 for flow of the atmospheric air 43 downwardly through the mass. The lower ends of the screws 15 may be capped as at 55 with a reverse screw of different pitch adapted to force the material downwardly to prevent clogging.

As heretofore stated, the bacteria must not be dislodged from the material being processed. It has been found that there is always a present danger of such dislodgement by employing continuous agitation. In order to thus prevent any possible bacterial dislodgement, intermittent agitation has been found to be ideal.

While I have described a specific embodiment of my invention, it will be apparent from the disclosure herein that changes and modifications may be made therein and as so changed, such structures would still fall within the ambit of my invention.

Having thus described my invention, what I claim as new and desire to secure by Letters Patent is:

1. A digester for solid flowable organic waste material comprising an upwardly opening receptacle adapted to contain a generally horizontal bed of said material, said receptacle including a delivery side and a discharge side, each of substantial linear extent, disposed in laterally spaced generally opposed relation, means for withdrawing digested material from the receptacle substantially uniformly throughout at least substantially the entirety of said discharge side and means for supplying fresh material into the receptacle substantially uniformly throughout at least substantially the entirety of said delivery side, a carriage supported for movement above said bed and means for moving said carriage transversely to a line between said sides to periodically move over at least substantially the full area of said bed, said material supplying means being supported by the carriage for movement therewith to distribute fresh material throughout said delivery side as said supply means moves with said carriage throughout the entire distance traveled by said carriage, and a series of rotary agitators carried by the carriage and depending generally vertically into the material to a point adjacent the bottom of said bed and means for rotating said agitators to lift the material engaged thereby to the bed surface.

2. A digester as in claim 1 including variable speed driving means carried by the carriage for causing rotation of the said agitators, and thermostatic means disposed in said material and operatively connected to said driving means for regulating the rate of rotation of the agitators in accordance with the changes in temperature of the material.

3. A digester as in claim 1 including driving means carried by the carriage for causing movement of the carriage, and thermostatic means disposed within the material within said receptacle and operatively connected to said driving means for regulating the rate of movement of the carriage in accordance with changes in temperature of said material.

4. A digester as in claim 1 wherein said receptacle is circular and its carriage is mounted for rotation about the axis of said receptacle and said material supply means includes an endless conveyor supported on said carriage for movement therewith, said conveyor having a radially outwardly moving operative run disposed with its material receiving end over the rotational axis of the carriage, and with its discharge end adjacent the inner periphery of said receptacle to distribute the material adjacent said periphery.

5. A digester for organic waste material comprising an upwardly opening receptacle adapted to contain a generally horizontal bed of said material, said receptacle including a delivery side and a discharge side, each of substantial linear extent, disposed in laterally spaced, generally opposed relation, material distributing means for introducing fresh material substantially uniformly throughout at least substantially the entirety of said delivery side of said receptacle, means for removing digested material from said bed generally uniformly throughout at least substantially the entirety of said discharge side of said receptacle to maintain a substantially constant bed depth, a carriage supported for movement above said bed, means for moving said carriage periodically over at least substantially the full area of said bed, a plurality of rotary agitators depending generally vertically from said carriage into said material to a point adjacent the bottom thereof, and means for rotating said agitators to lift the material engaged thereby to the bed surface.

6. A digester as in claim 5 wherein said material removing means comprises a discharge opening extending along the discharge side of said receptacle through which the digested material discharges to maintain said bed depth.

7. A digester as in claim 6 wherein said receptacle is circular having an outside peripheral wall along which the fresh material is introduced by said distributing means and a coaxial central inside opening constitutes said discharge opening extending along said discharge side and through which the digested material is discharged.

8. A digester as in claim 5 wherein each of said rotary agitators include a hollow shaft and at least one opening below the bed level communicating with the interior thereof, whereby said shaft is adapted to deliver air into the bed of material.

9. A digester as in claim 5 wherein each of said rotary agitators includes a helical blade coaxial with the axis of rotation thereof and has its lower end inclined at an acute angle toward the direction of movement of the carriage whereby engagement of said blades with the material assists in moving the carriage.

10. A method of aerobically digesting organic waste material in solid flowable form, characterized by the steps of maintaining a mass of said material undergoing thermophilic decomposition in a generally horizontal bed of substantially constant depth and having at least two sides of substantial linear extent, one of said sides being laterally spaced from and generally opposite to the other of said sides, adding fresh material to be digested in small increments compared to the mass in said bed substantially uniformly throughout at least substantially the entirety of one of said sides of said bed, removing sufficient digested material to maintain said substantially constant bed depth substantially uniformly throughout substantially the entirety of the other of said sides of said bed which is opposite to and laterally spaced from said first side, and periodically agitating said bed by raising material to the bed surface in laterally successive increments, said material being litfed within a zone covering a narrow elongated area of said bed extending generally at right angles to the bed surface, which zone is moved bodily and progressively through said bed.

11. A method as in claim 10 wherein the narrow elongated area covered by said zone stretches substantially the full distance between said sides and said zone is moved bodily in a transverse direction to a line between said sides.

12. A digester as in claim 5 including a housing for said receptacle, said housing at least extending over the opening of said receptacle to prevent the introduction of atmospheric precipitation into said receptacle.

References Cited in the file of this patent
UNITED STATES PATENTS

| | | |
|---|---|---|
| 394,601 | Noth | Dec. 18, 1888 |
| 2,178,818 | Earp-Thomas | Nov. 7, 1939 |
| 2,304,772 | Allardice et al. | Dec. 15, 1942 |
| 2,610,042 | Dryon | Sept. 30, 1947 |
| 2,864,672 | Brooks | Dec. 16, 1958 |
| 2,880,074 | Carmichael | Mar. 31, 1959 |
| 2,929,688 | Riker et al. | Mar. 22, 1960 |
| 3,022,142 | Sackett | Feb. 20, 1962 |
| 3,041,157 | Crane et al. | June 26, 1962 |
| 3,054,663 | Komline | Sept. 18, 1962 |